US008263727B1

(12) United States Patent
Kolel-Veetil et al.

(10) Patent No.: US 8,263,727 B1
(45) Date of Patent: Sep. 11, 2012

(54) POLYMERS MADE FROM POLYHEDRAL OLIGOMERIC SILSESQUIOXANES ACETYLENE-CONTAINING COMPOUNDS

(75) Inventors: Manoj K. Kolel-Veetil, Alexandria, VA (US); Teddy M Keller, Fairfax Station, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/479,386

(22) Filed: May 24, 2012

Related U.S. Application Data

(62) Division of application No. 13/211,347, filed on Aug. 17, 2011, now Pat. No. 8,211,994, which is a division of application No. 12/427,084, filed on Apr. 21, 2009, now Pat. No. 8,026,331.

(51) Int. Cl.
*C08G 77/20* (2006.01)
(52) U.S. Cl. .......................... 528/32; 528/31
(58) Field of Classification Search .......... 528/32, 528/31
See application file for complete search history.

(56) References Cited

FOREIGN PATENT DOCUMENTS

JP 2007 084618 * 4/2007

* cited by examiner

*Primary Examiner* — Kuo-Liang Peng
(74) *Attorney, Agent, or Firm* — Amy L. Ressing; Joseph T. Grunkemeyer

(57) ABSTRACT

A compound having the formula below. Each R is methyl or phenyl; $R^2$ comprises one or more of silane, siloxane, and aromatic groups; n is a nonnegative integer; and m is 1 or 2. The dashed bond is a single bond and the double dashed bond is a double bond, or the dashed bond is a double bond and the double dashed bond is a triple bond. A polymer made by a hydrosilation reaction of a polyhedral oligomeric silsesquioxane having pendant siloxane groups with an acetylene- and silicon-containing compound having at least two vinyl or ethynyl groups, and a crosslinked polymer thereof. The reaction occurs between the pendant siloxane groups and the vinyl or ethynyl groups.

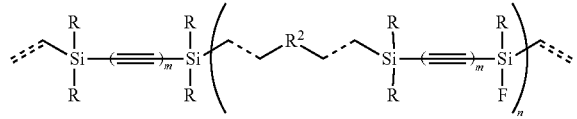

6 Claims, 10 Drawing Sheets

POLYMERS MADE FROM POLYHEDRAL OLIGOMERIC SILSESQUIOXANES ACETYLENE-CONTAINING COMPOUNDS

This application is a divisional application of U.S. patent application Ser. No. 13/211,347 filed Aug. 17, 2011, now U.S. Pat. No. 8,211,994, which is a divisional application of U.S. patent Ser. No. 12/427,084 filed Apr. 21, 2009, now U.S. Pat. No. 8,026,331.

TECHNICAL FIELD

The disclosure is generally related to polymers containing polyhedral oligomeric silsesquioxane (POSS) groups.

DESCRIPTION OF RELATED ART

POSS systems have found use in hybrid inorganic/organic polymers. Ladder-like silsesquioxane polymers have found applications in photoresist coatings for electronic and optical devices, interlayer dielectrics and protective coating films for semiconductor devices, liquid crystal display elements, magnetic recording media, optical fiber coatings, gas separation membranes, binders for ceramics and as carcinostatic drugs (Li et al., *J. Inorg. Organomet. Polym.* 2002, 11(3), 123-154). (All publications and patent documents referenced throughout this application are incorporated herein by reference.) In the area of surface modification and corrosion prevention, POSS systems have been used as surface modifiers, dispersion agents, coupling agents, crosslinking agents, adhesion promoters, co-monomers, moisture scavengers and corrosion protection agents (Id.). In biomedical science, POSS has been used in place of fumed-silica which is typically used as a filler for improving the chemical, physical and biological properties of membranes used in immunoisolatory applications (Pittman et al., *J. Macromol. Symp.* 2003, 196, 301-325).

Polydiacetylenes, which may be obtained from the thermal polymerization of diacetylenes, belong to materials that may change in response to external stimuli. Such materials are of interest due to the nature of coupled material responses, such as molecular structure and optical or mechanical properties. Interest in nanotechnology has added to the potential uses of such materials due to the possibility of fabricating dense arrays of nanodevices with built-in and measurable sensitivity to environmental conditions. Rapid sensing of dangerous biological agents (Charych et al., *Science,* 1993, 261, 585; Reichert et al., *J. Am. Chem. Soc.* 1995, 117, 829; Charych et al., *Chem. Biol.* 1996, 3, 113), micro- or nano-fluidic devices (Eddington et al., *Lab on a Chip,* 2001, 1, 96), or highly dense information storage (Albrecht et al., *J. Vac. Sci. Technol. A,* 1990, 8, 3386) are notable applications. Polydiacetylenes (PDAs) (Bloor et al., *Polydiacetylenes: Synthesis, Structure, and Electronic Properties* 1985 (Dordrecht: Martinus Nijhoff)) merit interest as these molecules may exhibit strong optical absorption and fluorescence emission that change dramatically with various stimuli, namely optical exposure (photochromism) (Day et al., *Isr. J. Chem.* 1979, 18, 325; Tieke et al., *J. Polym. Sci. A,* 1979, 17, 1631; Olmsted et al., *J. Phys. Chem.* 1983, 87, 4790; Carpick et al., *Langmuir* 2000, 16, 1270), heat (thermochromism) (Wenzel et al., *J. Am. Chem. Soc.* 1989, 111, 6123; Lio et al., *Langmuir* 1997, 13, 6524; Chance et al., *J. Chem. Phys.* 1977, 67, 3616; Carpick et al., *Langmuir* 2000, 16, 4639; Lee et al., *Macromolecules* 2002, 35, 4347), applied stress (mechanochromism) (Carpick et al., *Langmuir* 2000, 16, 1270; Muller et al., *Mol. Crysti. Liq. Cryst.* 1978, 45, 313; Nallicheri et al., *Macromolecules* 1991, 24, 517; Tomioka et al., *J. Chem. Phys.* 1989, 91, 5694), changes in chemical environment (Cheng et al., *Langmuir* 1998, 14, 1974; Jonas et al., *J. Am. Chem. Soc.* 1999, 121, 4580), and binding of specific chemical or biological targets to functionalized PDA side-chains (affinochromism/biochromism) (Charych et al., *Science,* 1993, 261, 585; Reichert et al., *J. Am. Chem. Soc.* 1995, 117, 829; Charych et al., *Chem. Biol.* 1996, 3, 113). Other properties may include high third-order nonlinear susceptibility, unique photo-conduction characteristics, and strong nanometer-scale friction anisotropy (Carpick et al., *Tribol. Lett.* 1999, 7, 79). The linear nature of their structures may facilitate the formation of uniformly separated linked moieties in a network. In addition, these ligands can be further converted to crosslinked systems by interforming 1,2- or 1,4-addition of the neighboring units. This in essence yields the network a second-tier of crosslinks that can impart structural reinforcement and additional spectroscopic properties to the network. For example, networks containing crosslinked diacetylenes can exhibit various absorptions in the visible spectrum depending on the extent of the crosslinking. In such systems, 'blue state', 'purple state' and 'red state' absorptions have been obtained which are either reversible or irreversible (Carpick et al., *J. Phys.: Condens. Matter* 2004, 16, R679).

Hydrosilation is a reaction available for the construction of inorganic-organic hybrid dendritic diacetylene-linked POSS networks. Hydrosilation reaction, the addition of a Si—H bond across an unsaturated organic moiety, has been used to create dendritic edifices of POSS materials, including one containing both POSS and carborane clusters within its network (Kolel-Veetil et al., *J. Polym. Sci. Part A: Polym. Chem.,* 2008, 46, 2581; US Patent Application Publication No. 2009/0018273). The reactions involved ambient condition hydrosilation reactions of the reactants in the presence of the heterogeneous hydrosilation catalyst known as the Karstedt catalyst (platinum-divinyl siloxane catalyst). The reactions were performed in hexane or toluene. These facile reactions produced flexible and transparent network films of the anticipated products. Several other hydrosilation reactions have also been reported for the production of networks containing POSS clusters (Bassindale et al., *J. Mater. Chem.* 1993, 3(12), 1319; Jaffres et al., *J. Chem. Soc., Dalton, Trans.,* 1998, 2767-2770; Casado et al., *J. Appl. Organometal. Chem.* 1999, 13, 245-259; Zhang et al., *J. Am. Chem. Soc.* 2000, 122, 6979; Saez et al., *Chem. Eur. J.* 2001, 7(13), 2758-2764; Manson et al., *J. Mol. Cat. A: Chem.* 2002, 182-183, 99-105; Wada et al., *Chem. Comm.* 2005, 95-97; Chen et al., *Thin Solid Films,* 2006, 514(1-2), 103-109; Seino et al., *Macromolecules,* 2006, 39, 8892-8894).

BRIEF SUMMARY

Disclosed herein is a method comprising: reacting, by a hydrosilation reaction, a polyhedral oligomeric silsesquioxane having pendant siloxane groups with an acetylene- and silicon-containing compound having at least two vinyl or ethynyl groups to form a polymer. The reaction occurs between the pendant siloxane groups and the vinyl or ethynyl groups. Also disclosed herein is a polymer made by the method, and a crosslinked polymer made by crosslinking the acetylene groups in the polymer. Also disclosed herein is a compound having the formula below. Each R is methyl or phenyl; $R^2$ comprises one or more of silane, siloxane, and aromatic groups; n is a nonnegative integer; and m is 1 or 2. The dashed bond is a single bond and the double dashed bond is a double bond, or the dashed bond is a double bond and the double dashed bond is a triple bond.

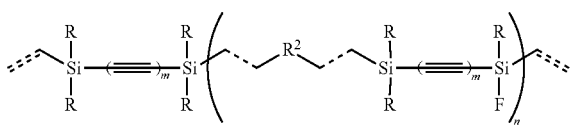

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
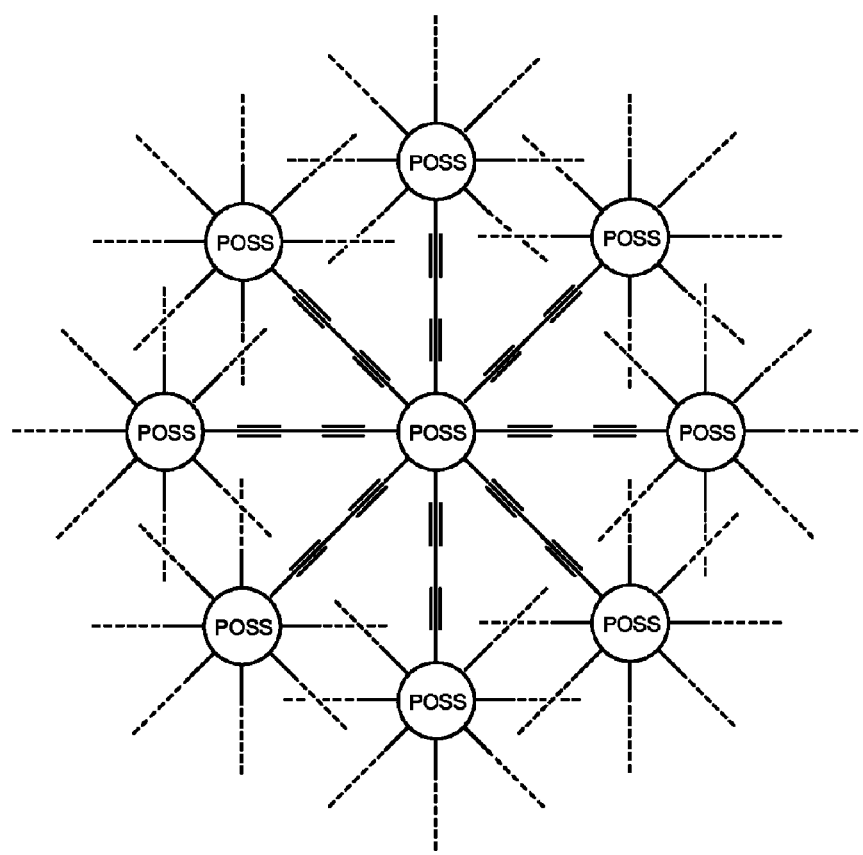
FIG. 1 schematically illustrates a hydrosilated network formed from POSS and diacetylene ligands.
Figure 2:
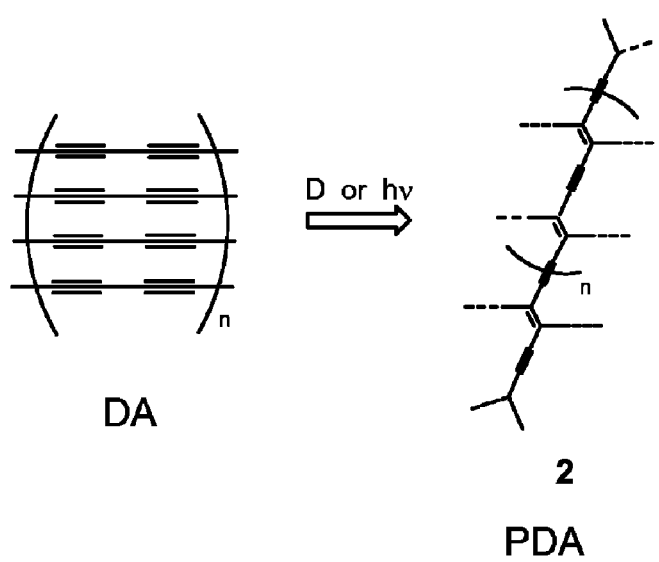
FIG. 2 illustrates generally the crosslinking of a polydiacetylene.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a method for the production of inorganic-organic hybrid dendritic polymers containing cores of polyhedral oligomeric silsesquioxanes (POSS) clusters linked by acetylene-containing crosslinkers, that may possess desirable thermal, thermo-oxidative, electrical, adhesive (coating/surface) and optical properties. The method utilizes hydrosilation reactions to construct the starting edifice of the acetylene-linked POSS dendritic systems and subsequent thermal polymerization of the acetylene linker ligands to create reinforced networked architectures that have potential for applications as smart coatings having thermal, photochemical, mechanical, and chemical responses.

Inorganic-organic hybrid polymers containing POSS clusters also have the potential to function as space-survivable materials when used as coatings owing to their surface adhesion on substrates and the ability to protect bulk material from vacuum ultraviolet radiation degradation and atomic oxygen collisions (Phillips et al., *Current Opinions in Solid State and Materials Science,* 2004, 8, 21-29). Unlike the bonds of organic molecules which undergo scission at about 4 eV, which is lower than the energy (5 eV) of atomic oxygen collisions, the Si—O bond requires 8 eV for disruption. The facile oxidation of the POSS clusters to $SiO_2$ can generally provide a passivating layer over the substrate when exposed to atomic oxygen collisions (Gilman et al., *J. Apply. Polym. Sci.* 1996, 60, 591-596; Gonzalez et al., *J. Spacecraft Rockets,* 2000, 37, 463-467; Hoflund et al., *J. Adhes. Sci. Technol.* 2001, 15, 1199-1211). Furthermore, an acetylene-linked POSS system may also have the ability to absorb the vacuum ultraviolet radiation through its diacetylene groups resulting in the crosslinking of such groups and in the reinforcement of the coating (Carpick et al., *J. Phys.: Condens. Matter* 2004, 16, R679).

Networks of POSS with rigid diacetylene linkers can also be targeted for forming materials of controlled porosity (Pielichowski et al., *J. Adv. Polym. Sci.* 2006, 201, 225-296). The cubic $(RSiO_{1.5})_8$ POSS octamers offer 4,4'-cage structures with high surface area similar to those found in zeolites (Breck D. W., *Zeolite Molecular Sieves,* 1984, Wiley, New York). In inorganic-organic hybrid dendritic systems containing such POSS clusters, the removal of the templated organic group such as diacetylene by calcination, chemical oxidation, chemical rearrangements or hydrolysis can further augment the porosity. Such a removal should provide the system with pores whose size and shape will roughly correspond to that of the eliminated moiety. This strategy, which is used in the preparation of zeolites, has only recently been applied in hybrid sol-gel materials (Choi et al. (eds.), *Photonic Polymer Synthesis,* 1998, Marcel Dekker, NY, p 437). For example, the thermolysis of templated aryl- and ethynyl-linked silsesquioxanes was observed to produce porous structures upon removal of the organic linkers (Shea et al., *J. Am. Chem. Soc.* 1992, 114, 6700). In an alternative approach developed at low temperature, inductively coupled plasma was used to burn away organic linking groups in crosslinked polysilsesquioxane xerogels thereby producing porous silica gels (Loy et al., *J. Non-Crystal Solids,* 1995, 186, 44; Loy et al., *Mater Res Soc Symp. Proc (Adv Porous Mater),* 1995, 371, 229).

Disclosed herein is a method to achieve the simultaneous incorporation of POSS and PDA in a polymeric system by the hydrosilation reactions of POSS and acetylene (DA)-containing monomers. POSSs have the general formula $(RSiO_{1.5})_a$ $(H_2O)_{0.5b}$ or rearranged to $R_aSi_aO_{(1.5a-0.5)}(OH)_b$, where a is a positive integer, b is a non-negative integer, a+b is a positive even integer, and $b \leq a+2$. In a completely condensed POSS, b is zero and all Si—O—Si bridges are complete. In an incompletely condensed POSS, some adjacent pairs of silicon atoms are not bridged, each containing an OH group. Suitable POSSs include, but are not limited to, $((SiH(CH_3)_2O)SiO_{1.5})_8$ 1 (octasilanePOSS), in which a=8, b=0, and R=$SiH(CH_3)_2$O—.

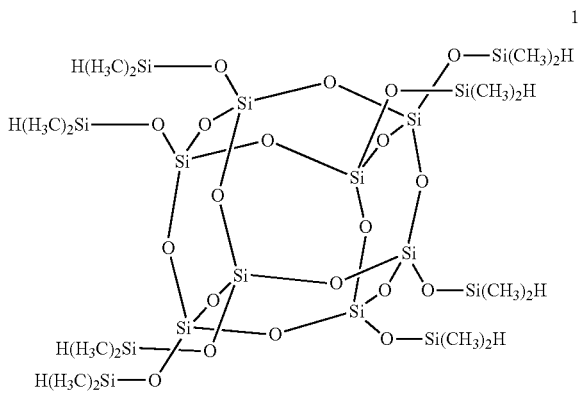

The POSS is reacted with an acetylene- and silicon-containing compound having at least two vinyl or ethynyl groups that can undergo the hydrosilation reaction. The compound may have two terminal vinyl or ethynyl groups and include siloxane and/or aromatic groups. The phrase "at least two vinyl or ethynyl groups" includes all vinyl groups, all ethynyl groups, and combinations of vinyl and ethynyl groups. The compound may itself be the reaction of a divinyl compound and silicon-containing compound in a 2:1 molar ratio, as in compounds 4a, 4b, 5a, 5b, 6a, and 6b. The compound may be made with other molar ratios. Regardless of the ratio, formation of the compound may produce a mixture of oligomers of different lengths, with no particular maximum length. Thus, the value of n in the compound disclosed in the Brief Summary is a nonnegative integer (including 0), and the polymer can include a combination of compounds having different values of n. The average value of n is determined by the molar ratio used when making the compound. Vinyl silane groups may be added to diacetylene groups as shown in the scheme below. The value of m may be 2 for a diacetylene compound, or 1 for a single acetylene group. Suitable compounds for reaction with the POSS include, but are not limited to, 3a, 3b, 4a, 4b, 5a, 5b, 6a, 6b, 7a, and 7b shown below. In the examples using these compounds, the average value of n is 1, but compounds include a combination of compounds having different values of n. Any of the silyl methyl groups may also be other alkyl or aryl groups. The compound may or may not be free of carborane groups.

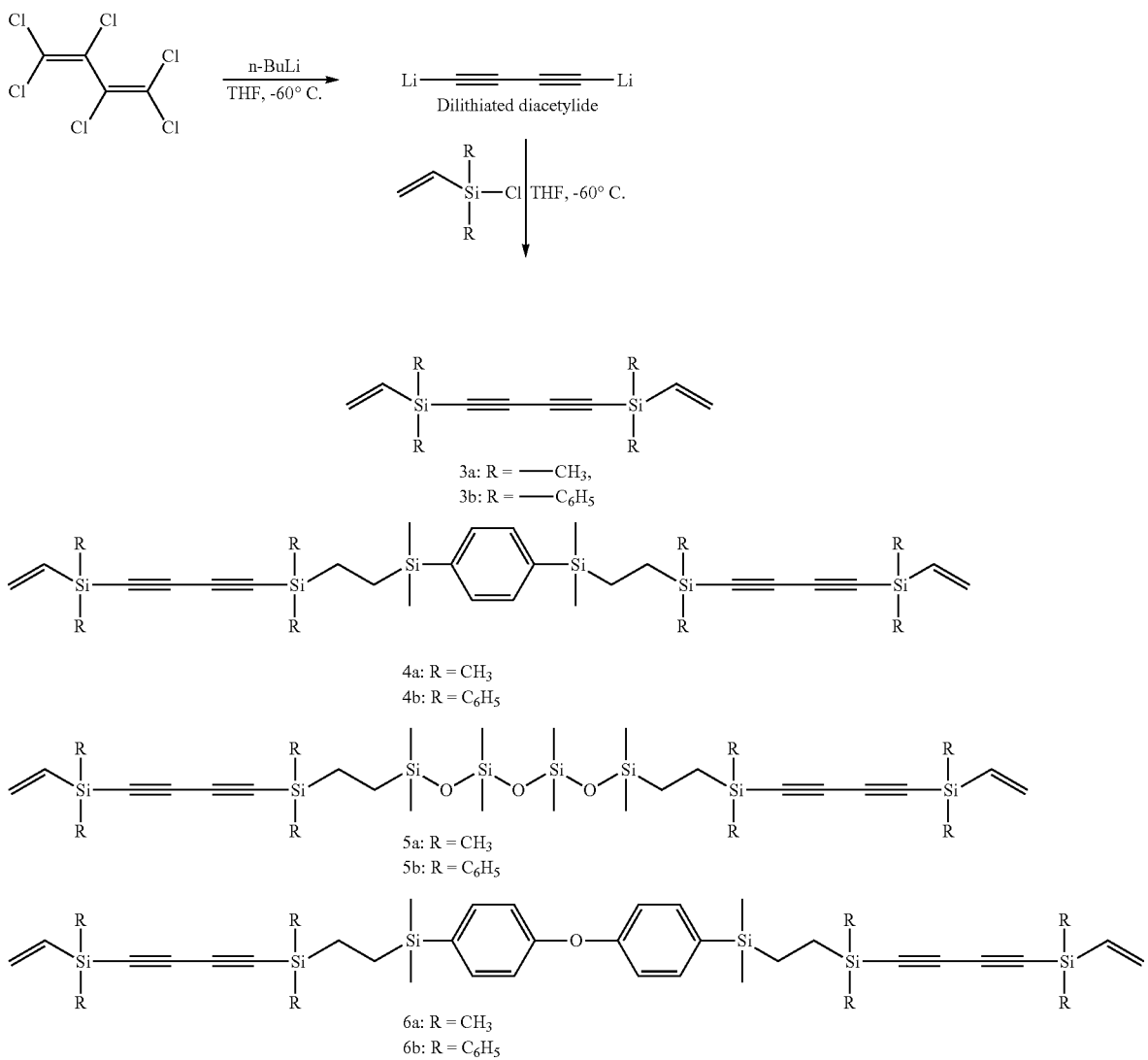

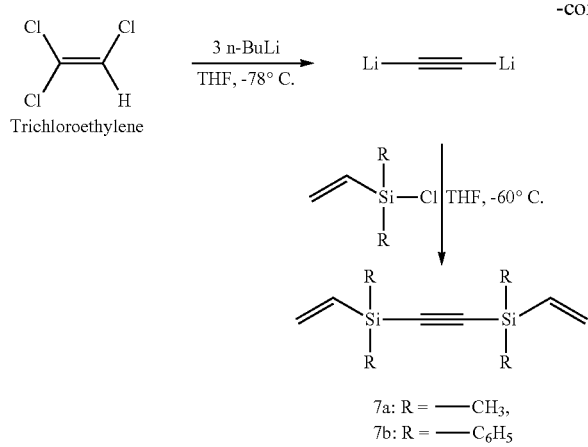

7a: R = —CH₃,
7b: R = —C₆H₅

The silyl hydrogens react with the vinyl or ethynyl groups of the compound. This is shown below for the reaction of a single vinyl group with a single silane. FIG. 1 schematically illustrates a hydrosilated network formed from POSS and diacetylene ligands. This may be performed in the presence of the Karstedt catalyst, $Pt_2\{[(CH_2=CH)Me_2Si]_2O\}_3$. The reaction may occur regardless of the particular POSS core or diacetylene- and silicon-containing vinyl compound used. The thermal stability of the networks can be attributed to the barrier effect to oxygen of POSS-containing systems (Ascuncion et al., *Macromolecules*, 2007, 40, 555) and on limited molecular mobility that POSS systems possess due to POSS-POSS interactions (Haddad et al., *Macromolecules*, 1996, 29, 7302).

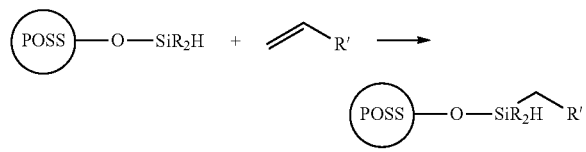

There may be diminished reactivity of the vinyl groups when there are phenyl groups on the Si atoms, as in 3b, in comparison to when there are methyl groups on the Si atoms, as in 3a. This is presumed to be due to the steric encumbrance caused by the two bulkier phenyl groups on the Si atom containing the vinyl group in 3b in comparison to the two sterically less demanding methyl groups on the Si atom that contain the vinyl group in 3a. Similar effects of steric factors on the rates of addition of Si—H across double bonds are known and the additions have been reported to occur more facilely at the least hindered side or face (when the hydrosilated ligand is of a cyclic type) (Weng et al., *Heteroatom. Chem.* 1995, 6(1), 15; Trofimov et al., *J. Org. Chem.* 2007, 72(23), 8910).

After formation of the hydrosilated network, the acetylene groups may be crosslinked to form a crosslinked polymer. This may be done by heating under an inert gas. During solid-state polymerization of diacetylenes, elongated polymer chains can be formed under preservation of the starting crystalline phase structure provided that the molecular motions accompanying chemical transformation compensate each other in a way to minimize the overall changes of the crystallographic parameters (Wegner, Naturforsch, 1969, 24B, 824; Baughman, *J. Appl. Phys.* 1972, 43, 4362). The removal of the diacetylene groups in such thermo-oxidatively-treated networks by calcination, chemical oxidation or hydrolysis can be expected to yield highly porous materials similar to zeolites with high surface area (Loy et al., *J. Non-Crystal Solids*, 1995, 186, 44; Loy et al., *Mater Res Soc Symp. Proc (Adv Porous Mater)*, 1995, 371, 229).

Figure 12:
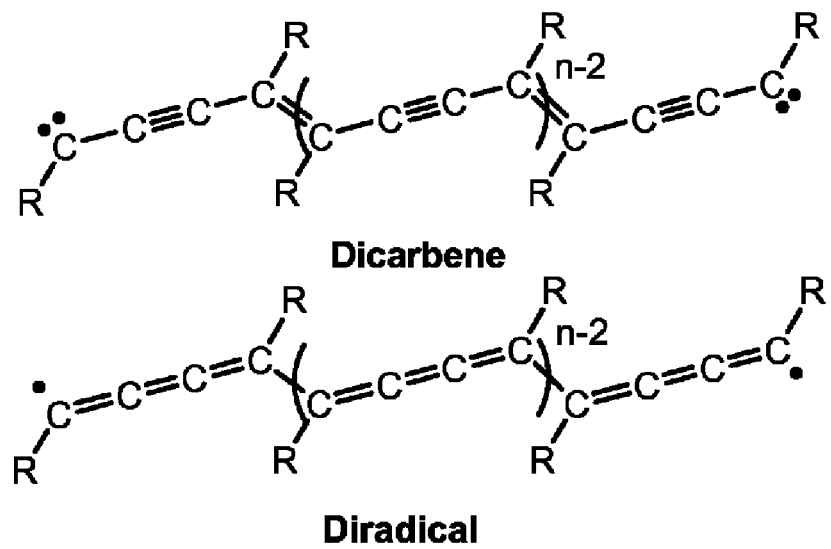
FIG. 12 as a depiction of a dicarbene species and a diradical species generated during the thermal or photopolymerization of diacetylenes.

It is known that the dicarbene or the diradical moieties (FIG. 12) function as chain initiators for the formation of an ene-yne or a butatriene-type of polymerization, respectively. In the case of the diradical intermediate, its energy of formation is lower than that of the dicarbene moiety, since its formation requires the disruption of only one C—C π-bond instead of two in the case of a dicarbene (Bassler et al., *Polydiacetylenes, Advances in Polym. Sci.* Vol. 63, Springer-Verlag, Berlin, 1984). It has been established by ESR work (Hori et al., *J. Am. Chem. Soc.* 1979, 101, 3173) and optical spectroscopy (Tobolsky, *Properties and Structures of Polymers*, Wiley, New York, 1960) that the diradical mechanism is in operation during the growth of oligomeric chains up to length of 5 repeat units. However, upon further addition of diacetylene units, the acetylenic structure become energetically more stable causing a cross-over to the dicarbene mechanism. Thus, in 3a(hydrosilated) and 3b(hydrosilated), the reactive species that is formed initially during the polymerization, as seen in the FT-IR spectrum, is the diradical species formed below a temperature of 100° C. during the polymerization in both ordered and disordered domains in the networks. Subsequently, as the polymerization temperature is increased, the diradical species that are present in the ordered domains undergo polymerization more easily, first to a short range order (n=5 repeat units) as diradical species and then undertake a dicarbene polymerization mechanism resulting in the formation of long-range ordered (n≧6 repeat units) polymerized diacetylene units in the networks in the temperature range of 100-140° C.

In some case, approximately one-third of the diacetylene units are believed to be participating in a long-range order polymerization, suggesting that approximately one-third of the linkers stay bound at only one of its termini to the POSS clusters. However, the remaining diradical species which are present mainly in the disordered amorphous regions remain less favorably positioned to find one another and react further. In order to facilitate their reactions, additional thermal energy may have to be supplied to the networks which may result in the thermal randomization of the domains and the eventual reaction of these diradical species within a short range order (n=5 repeat units) to form polymerized domains between the temperature range of 250-325° C.

The inorganic-organic hybrid dendritic polymers, containing cores of polyhedral oligomeric silsesquioxanes (POSS) clusters linked by diacetylene-containing crosslinkers are network polymers that contain uniformly spatially separated POSS units by diacetylene linkers. The POSS clusters are known for their exceptional chemical and material properties. In addition, the potential for exceptional stimuli-responsive properties (photochromism, thermochromism, mechanochromism and affinochromism/biochromism) of the PDA ligands produced in these dendritic networks make them candidates for applications such as smart coatings. Based on thermo gravimetric and differential scanning calorimetric analyses, the exceptional thermal and thermo-oxidative stabilities (revealed by the high char yields in air and in $N_2$) and the elastomeric properties (revealed by the low $T_g$'s) of the systems have already been demonstrated. The observation of irreversible red colored crosslinked networks ("red form") formed on thermal polymerization suggests that stimuli-responsive materials can be formed from these systems by controlling the extent of the thermal polymerization to a reversible stage such as a "purple form" or a "blue form" (Carpick et al., *J. Phys.: Condens. Matter* 2004, 16, R679). In addition, the diacetylene groups that are tethered around the rigid POSS clusters are also spatially constrained to a greater extent than in other typical diacetylene-containing polymers. This enhanced spatial separation/resolution of both POSS and diacetylene ligands bode well for the utilization of the invented materials in applications that requires structural constraints.

During polymerization of a hydrosilation product, two increases in storage modulus (G') may be seen corresponding to two distinct thermal polymerization events of diacetylenes. The enhancements in the G' value may be followed by a decrease in G'. Such decreases in the moduli of cured diacetylene-containing systems have been attributed to an excessive level of diacetylene polymerization leading to excessive network formation and a reduction of the structural properties (Tobolsky, A. V. *Properties and Structures of Polymers*, Wiley, New York, 1960). This decrease in the moduli has been further linked to the hard domains in the network that are formed under such conditions which are rendered non-deformable under high-strain conditions thereby nullifying an improvement in the domains' cohesion by the development of stronger nonbonded forces. Such domain cohesion was achieved only under an optimum level of diacetylene polymerization (Id.).

Using similar reaction conditions as with 3a and 3b, 7a and 7b can be individually reacted with Octasilane-POSS 1 to form 7a(hydrosilated) and 7b(hydrosilated), respectively. The conversion of 7a(hydrosilated) and 7b(hydrosilated) to 7a(polymerized) and 7b(polymerized), respectively, can be achieved by thermal means (Fan et al., *Polym. Int.* 2006, 55, 1063-1068; Fan et al., *Polym. Bull.* 2006, 56(1), 19-26) or by the use of a transition metal-based catalyst (Masuda et al., *Acc. Chem. Res.* 1984, 17, 51-56; Masuda et al., *Macromolecules* 1989, 22(3), 1036-1041).

The following examples are given to illustrate specific applications. These specific examples are not intended to limit the scope of the disclosure in this application.

Example 1

Materials and Instrumentation

The POSS monomer OctaSilanePOSS® (1) and the Karstedt catalyst (platinum-divinyl tetramethyldisiloxane complex in xylene, 2.1-2.4% Pt) were procured from Hybrid Plastics, Inc. and Gelest, Inc., respectively, and were used as received. Vinyldimethylchlorosilane and vinyldiphenylchlorosilane, from Gelest, Inc., were distilled under argon at their boiling points, 82° C. and 125° C., respectively, prior to use. Toluene (anhydrous, 99.8%), N-butyllithium (n-BuLi, 2.5 M solution in hexanes), tetrahydrofuran (THF, anhydrous, 99.9%), diethyl ether ($Et_2O$, anhydrous, 99.5%), chloroform-d ($CDCl_3$, 99.6+ atom % D), ammonium chloride ($NH_4Cl$, 99.5+%), granular sodium sulfate ($Na_2SO_4$, anhydrous, 99+%), activated carbon (Darco® 41-2 mesh, granular) and filter agent, Celite® 521 (celite) were all obtained from Aldrich and used as received. Hexachloro-1,3-butadiene ($C_4Cl_6$, 97%, Aldrich) was vacuum-distilled (220 mT, 49.5° C.). Note: $C_4Cl_6$ is toxic as are most other chlorinated reagents. The reaction scheme for the synthesis of the diacetylene-containing monomer (3a or 3b) is depicted above. The syntheses were performed under an atmosphere of dry argon utilizing standard Schlenk techniques. Thermogravimetric analyses (TGA) were performed on a SDT 2960 simultaneous DTA-TGA analyzer. The differential scanning calorimetry (DSC) studies were performed on a DSC 2920 modulated DSC instrument from −60° C. to 400° C. All thermal experiments (TGA and DSC) were carried out with heating rates of 10° C./min and nitrogen or air flow rate of 100 $cm^3$/min. Infrared (IR) spectra were obtained on NaCl plates for the starting materials and as thin films of the various produced dendritic networks using a Nicolet Magna 750 Fourier transform infrared spectrometer. Solution-state $^1H$ and $^{13}C$ NMR spectra were acquired on a Bruker AC-300 spectrometer and referenced to the peak of the internal solvent, $CDCl_3$. Rheological measurements were performed from ambient temperature to 400° C. in a nitrogen atmosphere on a TA Instruments AR-2000 rheometer in conjunction with an environmental testing chamber for temperature control. Measurements on rectangular solid samples were carried out in the torsion mode at a strain of $2.4 \times 10^{-4}$ and a frequency of 1 Hz. Samples were prepared in silicone molds with cavity dimensions 52 mm×12 mm×10 mm by transferring flowable reaction mixtures into the molds to allow further gelation and concurrent expulsion of solvent at room temperature. The storage modulus (G') and loss tangent (tan δ) were determined as a function of temperature in the 25-400° C. temperature range at a heating rate of 3° C./min.

Example 2

Synthesis of 3a and 3b

Anhydrous THF (50 mL) and n-BuLi (46.7 mL, 2.5 M, 116.75 mmol) were transferred to a sealed 50-mL Kjeldahl reaction flask containing a magnetic stir bar. The reactions flask had been evacuated under vacuum and back-filled with argon prior to the additions. The flask was then immersed in a dry ice/2-propanol bath. While stirring, $C_4Cl_6$ (5 mL, 32 mmol) was added dropwise over 20 min, forming a blue, then purple, and then black solution. The dry ice/2-propanol bath was removed and the reaction mixture was warmed to room temperature with stirring over 2 h. The mixture was then cooled further in a dry ice/2-propanol bath and vinyldimethylchlorosilane (8.3 mL, 60 mmol) or vinyldiphenylchlorosilane (13.5 mL, 60 mmol) was added drop wise to initiate the formation of 3a or 3b, respectively. The reaction mixture was further warmed to room temperature with stirring over 2 h and the contents were then poured into a saturated $NH_4Cl$ solution (150 mL, aqueous) at 0° C. The reaction flask was then rinsed with $Et_2O$ into the $NH_4Cl$ quench solution. The resulting two-phase mixture was transferred to a 500-mL reparatory funnel and washed with a saturated NH$_4$Cl (aq) solution until the pH was neutral and then two times with distilled H$_2$O. The dark organic phase was poured into an Erlenmeyer flask and dried over anhydrous Na$_2$SO$_4$ and activated carbon. The dried solution was filtered through celite into a round-bottomed flask, concentrated by rotary evaporation, and then exposed to reduced pressure at room temperature for 5 h. In the case of 3a, a brownish red solution was obtained. Distillation of this brownish red solution yielded 3a as a clear reagent. In the case of 3b, a brownish red solid was collected. Crystallization of the solid from its concentrated solution in Et$_2$O yielded pale red crystals of the (divinyldiphenylsilyl)-μ-diacetylide reagent.

Figure 3:
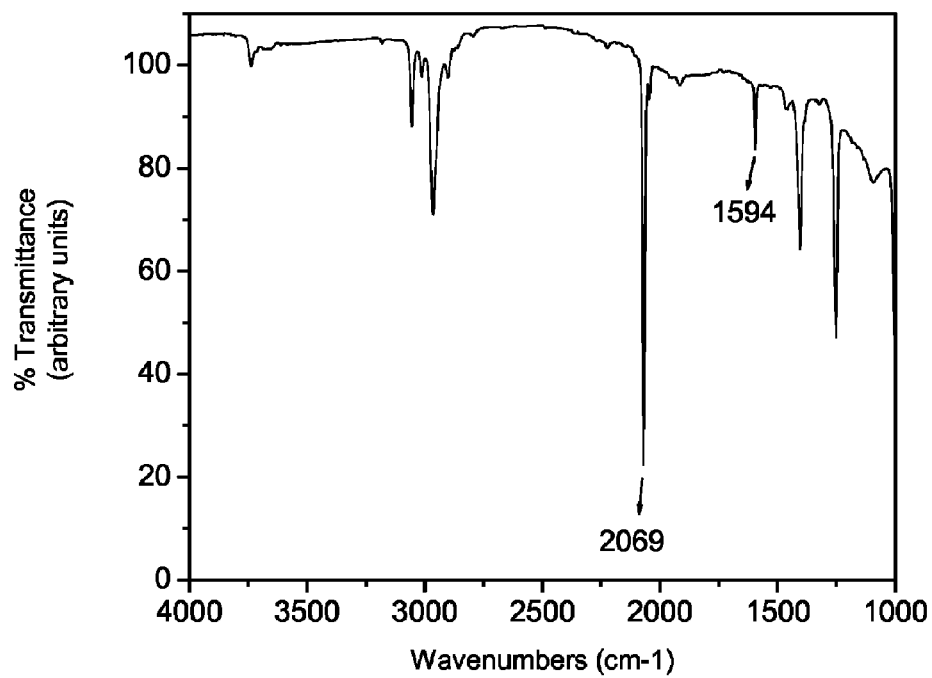
FIG. 3 shows FT-IR spectra of 3a (top) and of 3b (bottom) depicting the diacetylene and vinyl absorptions.
Figure 3:
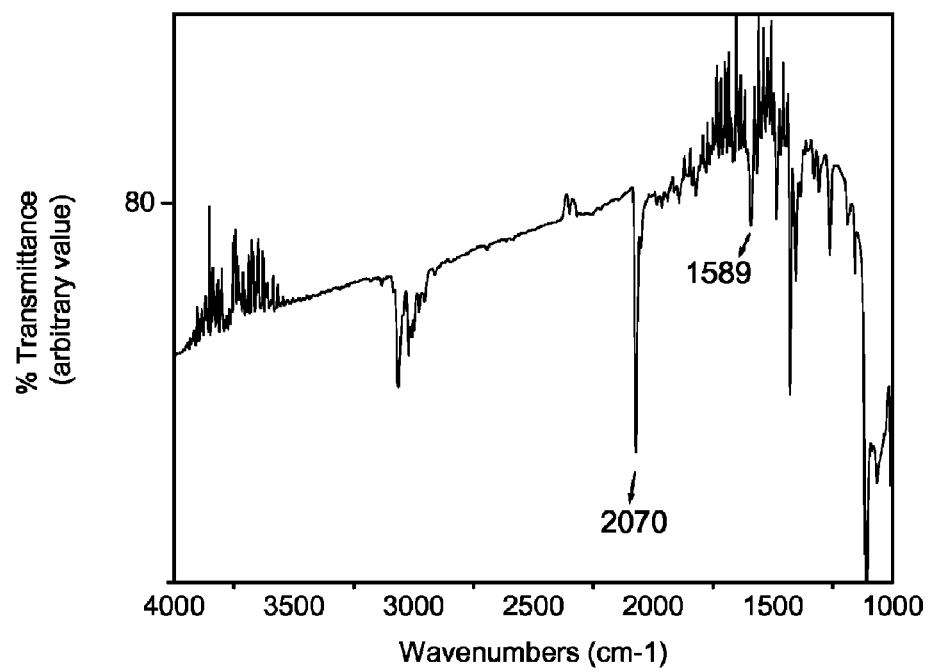
Figure 4:
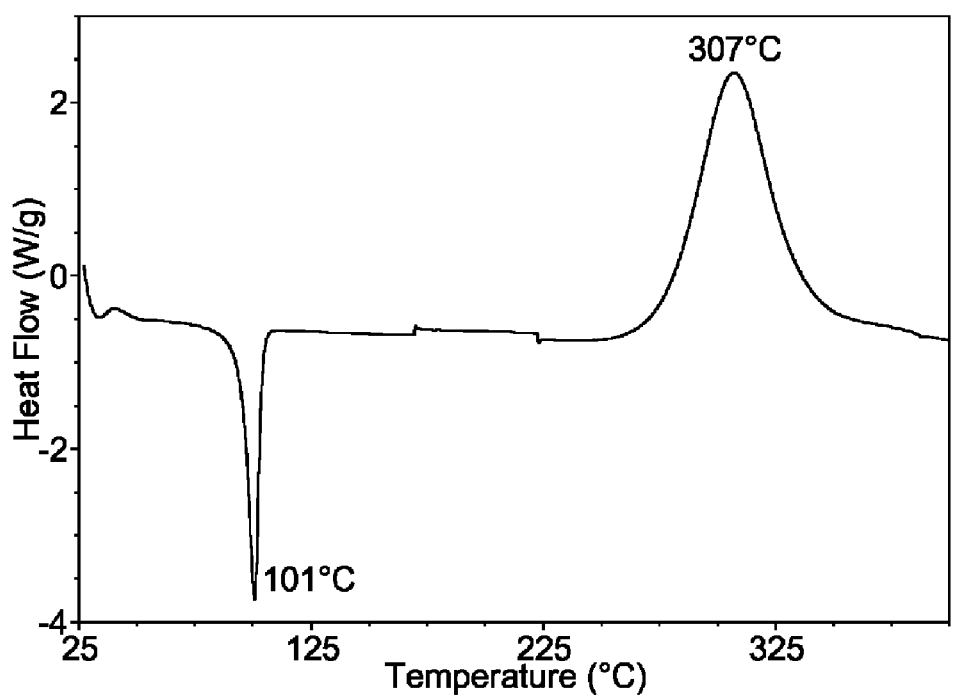
FIG. 4 shows a DSC thermogram of the crystalline 3b, depicting the melting endotherm and the exotherm during the polymerization of the diacetylene moieties.

FT-IR: 3a: ν (—C≡C—C≡C—): 2069 cm$^{-1}$ and ν (—CH═CH$_2$): 1594 cm$^{-1}$ (FIG. 3). 3b: ν (—C≡C—C≡C—): 2070 cm$^{-1}$ and ν (—CH═CH$_2$): 1594 cm$^{-1}$ (FIG. 3). $^1$H NMR (in ppm): 3a: 6.18-5.83 (—CH═CH$_2$) and 0.261 (—CH$_3$). 3b: 7.68-7.38 (C$_6$H$_5$—) and 6.510-5.990 (—CH═CH$_2$). $^{13}$C NMR (in ppm): 3a: (135.76, 134.62) (—CH═CH$_2$) (sp$^2$ C), (89.62, 84.79) (—C≡C—C≡C—) (sp C) and −1.27 (—CH$_3$) (sp$^3$ C). 3b: (132.25, 131.87) (—CH═CH$_2$) (sp$^2$ C), (91.89, 81.90) (—C≡C—C≡C—) (sp C) and (138.04, 135.41, 130.45, 128.11) (C$_6$H$_5$—) (sp$^2$ C). DSC analysis (from RT to 400° C. at 10° C./min) in N$_2$ of 3b: Melting endotherm at 101° C. and exotherm at 307° C. (FIG. 4).

Example 3

Figure 5:
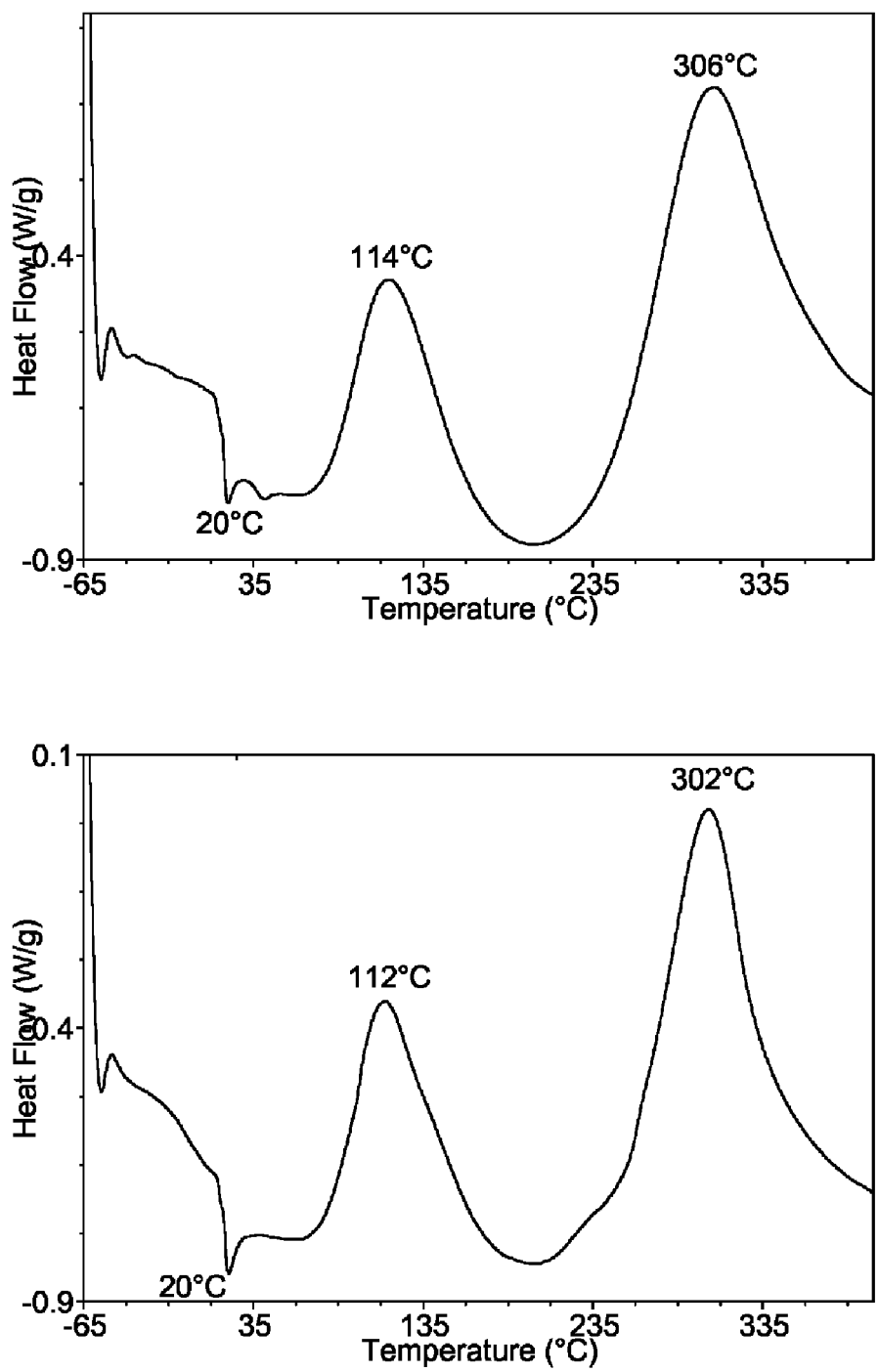
FIG. 5 shows DSC thermograms of 3a(hydrosilated) (top) and 3b(hydrosilated) (bottom) in $N_2$.
Figure 6:
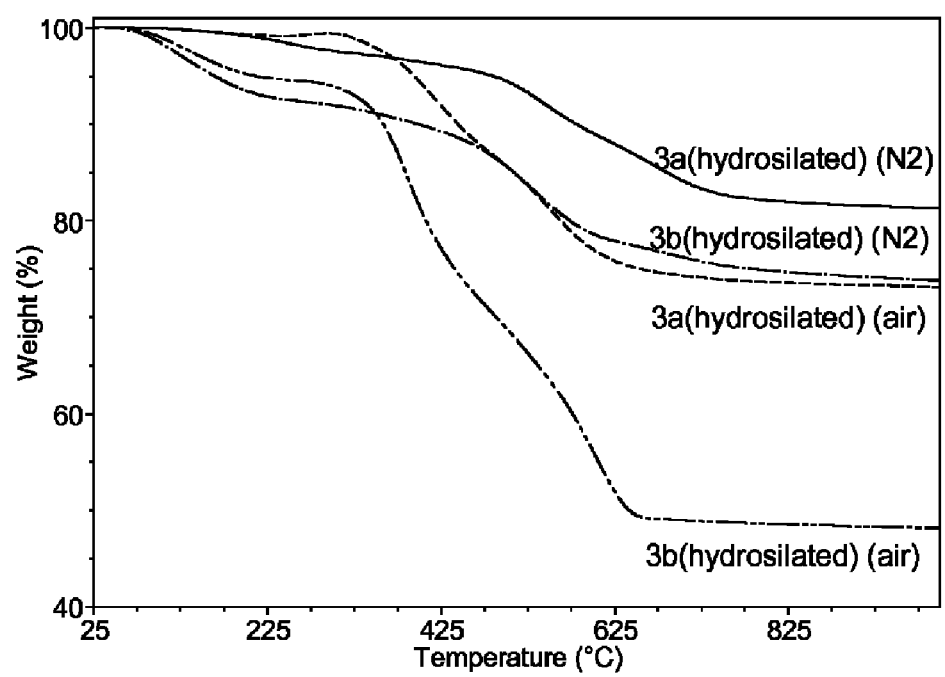
FIG. 6 shows TGA thermograms of 3a(hydrosilated) and 3b(hydrosilated) in $N_2$ and in air.

Formation of the Inorganic-Organic Hybrid Hydrosilated Dendritic Network, 3a(Hydrosilated), from Reaction of 1 and 3a Octasilane-POSS 1 (0.5 g, 0.49 mmol) and 3a (0.43 g, 1.96 mmol) were mixed with 2.5 mL of toluene to yield a clear solution. To this solution, 45 μL (4.95 μmol of Pt) of the Karstedt catalyst solution was added and the mixture was mixed vigorously for 2 min using a mechanical stirrer. The solution took on a pale yellow hue indicating the initiation of the hydrosilation reaction. The mixture was then transferred into a Teflon mold to facilitate the formation of a clear and transparent film at ambient conditions. DSC analysis of a 3a(hydrosilated) film sample under a flow of N$_2$: An endotherm at 20° C. and exotherms at 114° C. and 306° C. were observed in the thermogram (FIG. 5). TGA analysis of a 3a(hydrosilated) film sample: In N$_2$, a 5% weight loss was observed at 485° C. and the weight retention at 1000° C. was 81%. In air, a 5% weight loss occurred at 400° C. and the weight retention at 1000° C. was 73% (FIG. 6).

Example 4

Thermal Polymerization of the Diacetylene Units in 3a(Hydrosilated) to Form 3a(Polymerized)

A well-formed film of 3a(hydrosilated) was thermally ramped under argon in an oven to 400° C. in an hour and was heated at this temperature for 2 h. Subsequently, the film was cooled to room temperature in 1 h. This resulted in the formation of a dark red 3a(polymerized) film. TGA analysis of a 3a(polymerized) film sample: In N$_2$, a 5% weight loss occurred at 587° C. and the weight retention at 1000° C. was 88%. In air, a 5% weight loss occurred at 448° C. and the weight retention at 1000° C. was 79% (FIG. 6).

Example 5

Formation of the Inorganic-Organic Hybrid Hydrosilated Dendritic Network 3b(Hydrosilated) from Reaction of 1 and 3b Octasilane-POSS 1 (0.50 g, 0.49 mmol) and 3b (0.91 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The solution remained clear indicating that the initiation of the hydrosilation reaction had not occurred. Hence, the mixture was transferred into a Teflon mold and was heated on a hot plate at 80° C. for 1 h to facilitate the formation of a clear and transparent film. DSC analysis of a 3b(hydrosilated) film sample in N$_2$: An endotherm at 20° C. and exotherms at 112° C. and 302° C. were observed in the thermogram (FIG. 5). TGA analysis of a 3b(hydrosilated) film sample: In N$_2$, a 5% weight loss occurred at 164° C. and the weight retention at 1000° C. was 74%. In air, a 5% weight loss occurred at 218° C. and the weight retention at 1000° C. was 49% (FIG. 6).

Example 6

Thermal Polymerization of the Diacetylene Units in 3b(Hydrosilated) to Form 3b(Polymerized)

A well-formed film of 3b(hydrosilated) was thermally ramped under argon in an oven to 310° C. in an hour and was heated at this temperature for 2 h. Subsequently, the film was cooled to room temperature in 1 h. This resulted in the formation of a dark red 3b(polymerized) film.

The crystalline linker 3b was further investigated to ascertain whether its diacetylene groups could be polymerized by thermal means in its solid-state. The DSC thermogram of the crystalline 3b, exhibited a melting endotherm at 101° C. and broad exotherm at 307° C. (FIG. 4). Therefore, it appears that in 3b, the thermal polymerization of the diacetylene triple bonds occurs in a disordered amorphous phase and not in a solid-state (crystalline state) (Corriu et al. *J. Organomet. Chem.* 1993, 449, 111).

Figure 7:
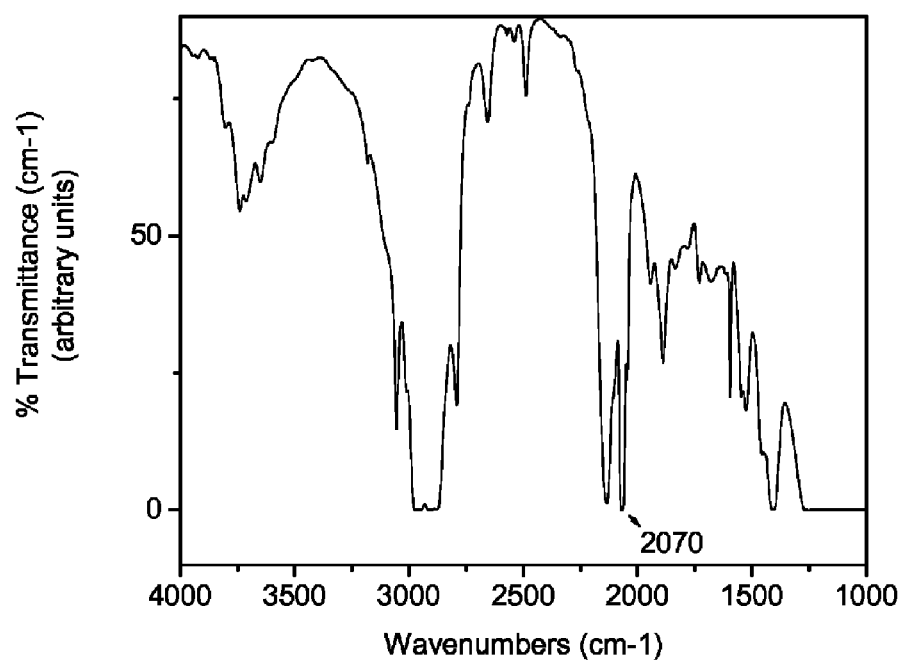
FIG. 7 shows FT-IR spectra of 3a(hydrosilated) (top) and of 3b(hydrosilated) (bottom) depicting the diacetylene absorption contained in the networks.
Figure 7:
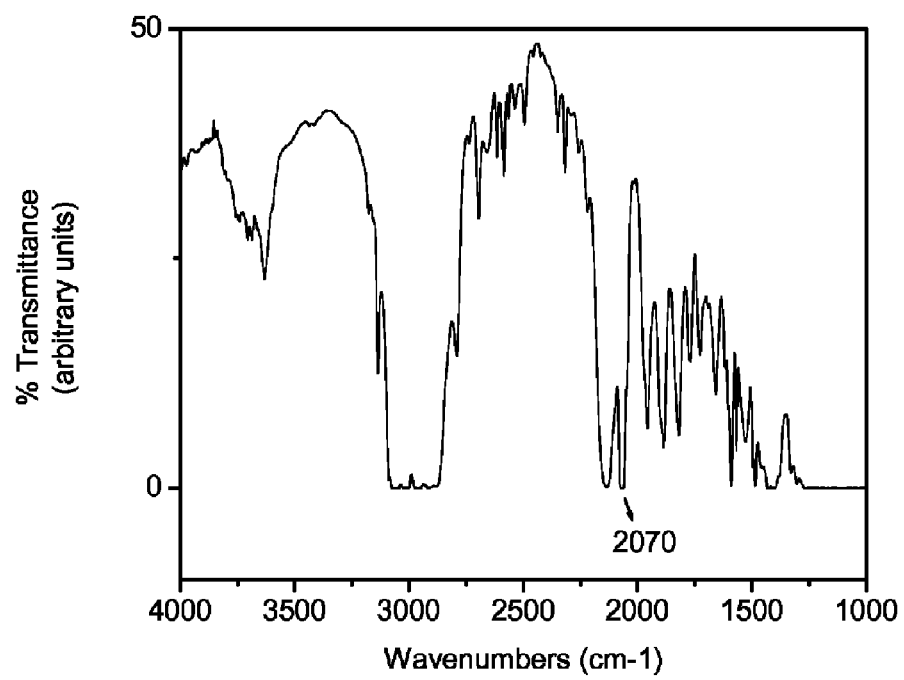

During the formation of the dendritic networks from 1 and 3a or 3b, the onset and progress of the reaction was monitored by the FT-IR characterization of the reaction mixture. A gradual disappearance of the vinyl absorption of 3a or 3b at 1594 cm$^{-1}$ and 1589 cm$^{-1}$, respectively, and the disappearance of the Si—H absorption at 2140 cm$^{-1}$ of the octasilane-POSS (FIG. 7) indicated the progress of the reaction. The addition of the linker alkenes 3a and 3b was found to follow both Markonikov and anti-Markonikov modes during the addition to one of its termini, as determined by reactions of ligands to them, which are to be published elsewhere. After the initial hydrosilation reactions, the diacetylene absorptions in both 3a(hydrosilated) and 3b(hydrosilated) networks appeared at 2070 cm$^{-1}$. However, some unreacted vinyl groups of 3a and 3b and unreacted Si—H groups of 1 were also observed in the FT-IR spectrum of the reaction products. Thus, it appears that all of the 8 reactive Si—H bonds in a POSS cluster may not be accessible for reaction at ambient temperature with the terminal vinyl groups in 3a and 3b due to steric crowding around the POSS cluster. This situation in the generated networks is not surprising considering the fact that the linker groups 3a and 3b are not particularly long. Soxhlet extractions of the products were performed in toluene to determine whether there was any unreacted 3a or 3b entrapped in the network. The small amount of sol fraction (less than 2%) suggested that almost the entire amount of the linkers were bound, at least at one of their termini, to the POSS clusters in the generated networks. The progress of the reaction can also be monitored by $^1$H and $^{13}$C NMR spectroscopy. Incidentally, the reaction of 1 with 3a was found to proceed facilely at room temperature in comparison to its reaction with 3b, which was found to be sluggish at ambient temperature. In order to obtain a similar extent of reaction of 1 with 3b as with 3a, the mixture of 1 and 3b had to be treated with twice the amount of the Karstedt catalyst and had to be heated at 80° C. for 1 h.

The hydrosilated network 3a(hydrosilated), with intact internal diacetylene groups, was observed to be extremely thermally stable as evidenced by its high temperature of degradation (temperature of 5% weight loss) of 485° C. and its high weight retention of 81% at 1000° C. when heated in a $N_2$ atmosphere (FIG. 6). The 19% weight loss at 1000° C. corresponded to a loss of about three-quarters of the labile Si-bound methyl groups in the network, since Si, O, and the carbons of the diacetylene groups are not known to be lost at such conditions unless present in pendant groups (Corriu et al. *J. Organomet. Chem.* 1993, 449, 111; Corriu et al., *Chem. Mater.* 1996, 8, 100). In this regard, of the total 32 methyl groups in a repeat dendritic unit in 3a(hydrosilated), half of the Si-bound methyl groups belong to the peripheral Si atoms of the dimethylsiloxyl groups of 1 and the other half are bound to the Si atoms of the 3a linker. The ~19% weight loss corresponds to a loss of 24 Si-bound methyl groups. Of particular interest, then, is the question as to which of the Si-methyl groups gets retained upon crosslinking and formation of 3a(hydrosilated). An answer to this becomes apparent when the TGA thermogram of 3b(hydrosilated) network is analyzed (FIG. 4). In 3b(hydrosilated), there are 16 Si-bound methyl groups on the peripheral Si atoms of the dimethylsiloxyl groups of 1 and 16 Si-bound phenyl groups on the Si atoms of 3b linker. The weight loss of ~26% at 1000° C. in this network requires that at least 8 phenyl groups of the linker ligand be retained in the final product, since a loss of all the phenyl groups of 3b would have brought the final char yield to around 55%. By extrapolation, it appears that the retention of 8 methyl groups and 8 phenyl groups on thermal treatment of 3a(hydrosilated) and 3b(hydrosilated) to 1000° C. in $N_2$, respectively, occurs at the Si atoms of the linkers 3a and 3b. Similarly, the weight loss, at 1000° C. in air, of 27% for 3a(hydrosilated) and of 51% for 3b(hydrosilated) represent a complete loss of all the pendant methyl and phenyl groups in the two systems. This suggests that the treatment of 3a(hydrosilated) and 3b(hydrosilated) to 1000° C. in air should yield dendritic systems containing only crosslinked diacetylene groups as the organic functionality.

Figure 8:
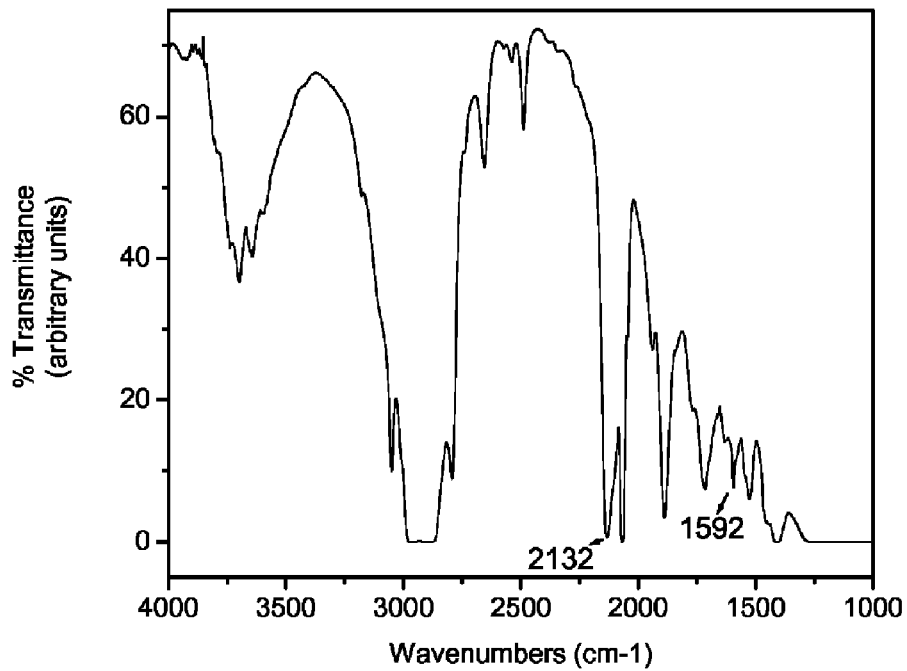
FIG. 8 shows FT-IR spectrum (top) and DSC thermogram (bottom) of a 3a(hydrosilated) film after thermal treatment at 150° C. for 4 h.
Figure 8:
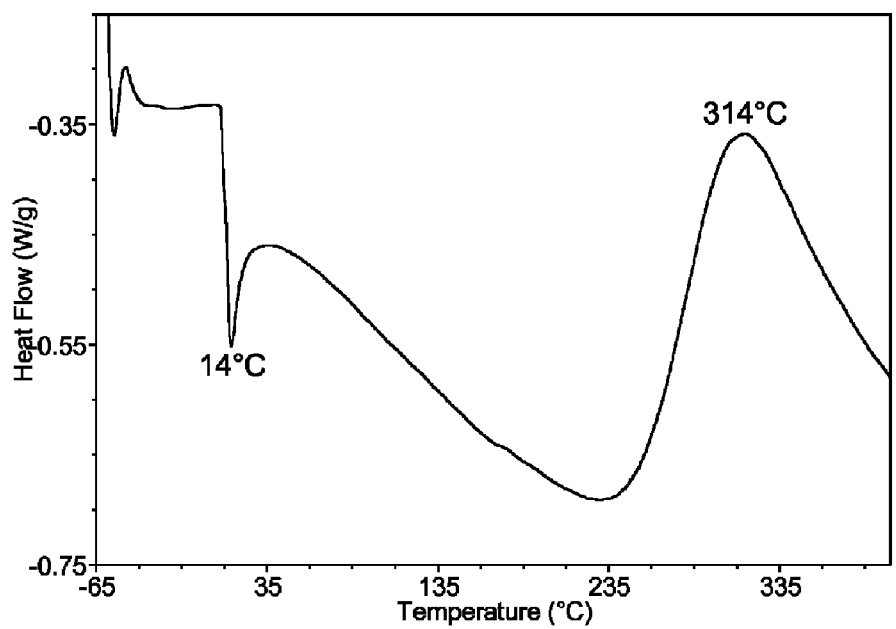
Figure 9:
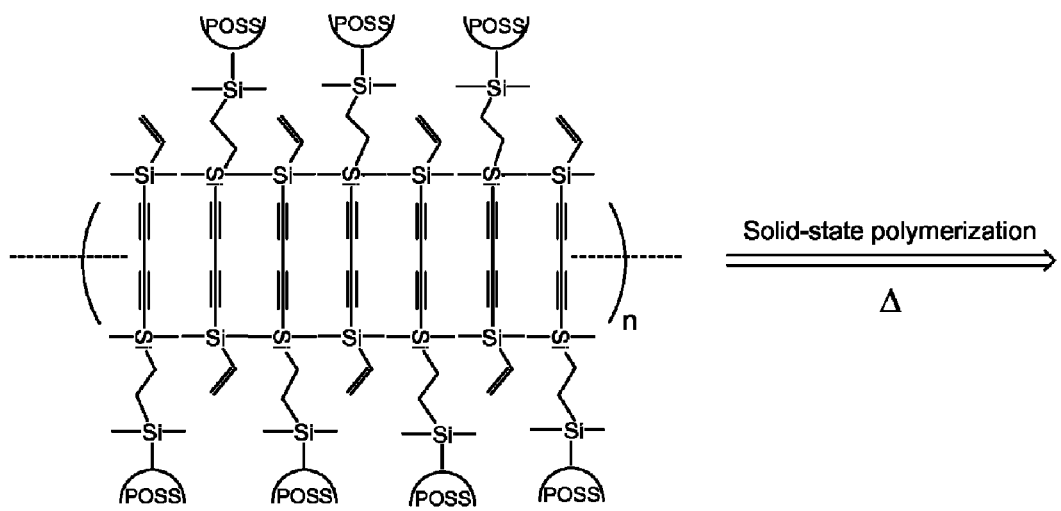
FIG. 9 is a schematic 2-dimensional depiction of the interdigitation of partially reacted 3a linkers bound to clusters of 1 involved in the solid-state polymerization at ~110° C. in 3a(hydrosilated).

In investigating the thermal polymerization of diacetylenes in 3a(hydrosilated) and 3b(hydrosilated), it was of interest to determine whether the thermal polymerization of the diacetylene groups occurred in a solid-state or rather in a disordered amorphous phase, as observed in 3b. The DSC thermogram of 3a(hydrosilated) (FIG. 5) exhibited an endotherm at 20° C. and exotherms at 114° C. and 306° C. However, an important aspect to consider was whether the two exotherms were a result of distinct events of diacetylene polymerizations in 3a(hydrosilated). Since the exotherm at 306° C. was presumed to have originated from the thermal polymerization of diacetylenes, for example as observed similarly in 3b, it was necessary to determine the origin of the 114° C. exotherm. Hence, a film of 3a(hydrosilated) was treated at 150° C. for 4 h in $N_2$ to ensure the completion of the exothermic event around 114° C. During this thermal treatment, the sample took on a red hue suggestive of the thermal polymerization of diacetylenes. The FT-IR spectrum and the DSC thermogram of the treated sample were obtained to further examine the origin of the exothermic event (FIG. 8). The FT-IR spectrum exhibited the retention of the vibrations of unreacted Si—H bonds of 1 and the vinyl groups of 3a. This suggested that the exotherm at 114° C. originated from the thermal polymerization of diacetylenes and not from another exothermic event such as the reaction of any residual Si—H bonds of 1 and the vinyl groups of 3a. In addition, the DCS thermogram of the treated sample to 400° C. in $N_2$ exhibited only a single exotherm at 315° C., indicating the complete disappearance of the diacetylene units in 3a(hydrosilated) that caused polymerization attributed to the exotherm at 114° C. Thus, it appears that the lower exotherm at 114° C. represents a solid-state type polymerization of diacetylenes and the higher exotherm at 306° C. belongs to a polymerization of diacetylenes in an amorphous disordered state in 3a(hydrosilated). The solid-state type regions in 3a(hydrosilated) probably originated from the interdigitation of diacetylene units belonging to proximal partially reacted (bound at a single terminus) 3a linkers attached to clusters of 1 as shown in FIG. 9. The low temperature (114° C.) of the initial exotherm for this solid-state polymerization of the diacetylenes in an ordered crystalline-like phase in comparison to the higher temperature (306° C.) for the diacetylene polymerization in the disordered amorphous regions is not surprising considering reports that solid-state polymerization of diacetylenes can occur even at room temperature and very easily at 80° C. (Bloor et al., *J. Mater. Sci.* 1975, 10, 1678; Wegner, *Makromol. Chem.* 1972, 154, 35). A similar DSC thermogram (FIG. 5) was also observed for 3b(hydrosilated) with an endotherm at 20° C. and exotherms at 112 and 302° C., which suggested that the dendritic systems in the two cases were very similar.

Figure 10:
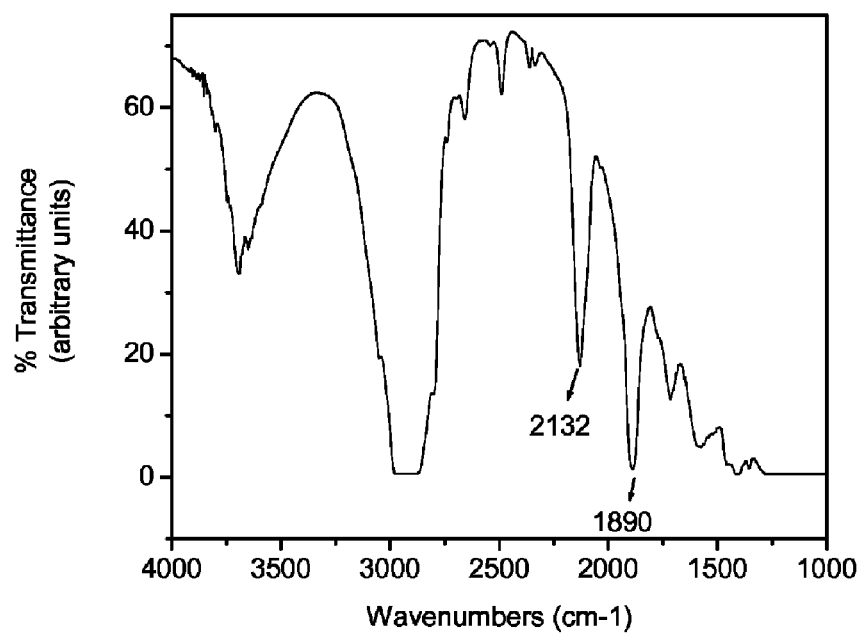
FIG. 10 shows FT-IR spectrum of 3a(polymerized) exhibiting absorptions of ene-yne (2132 $cm^{-1}$) and butatriene (1890 $cm^{-1}$) absorptions.
Figure 11:
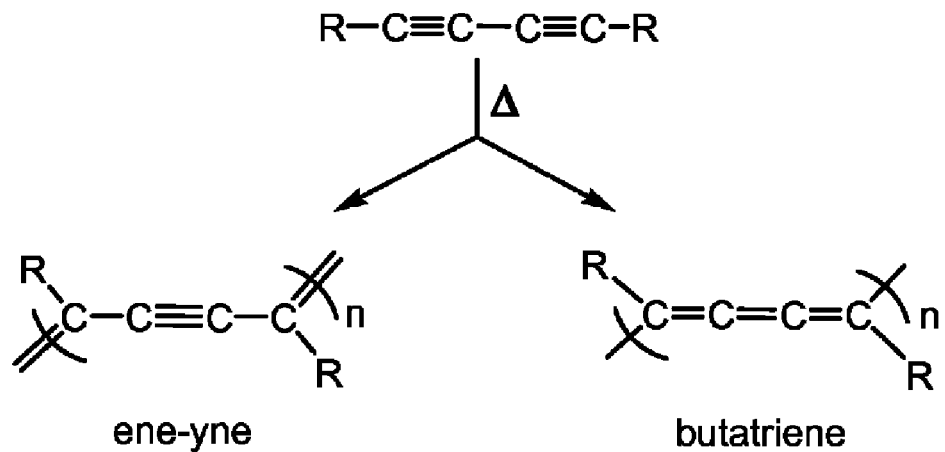
FIG. 11 illustrates the formation of ene-yne and butatriene groups.

The operation of two distinct events of thermal polymerization of diacetylene units during the thermal treatment of 3a(hydrosilated) is apparent in the FT-IR spectrum of the resulting polymerized product 3a(polymerized) (FIG. 10), which was obtained upon the complete thermal polymerization of the diacetylene units in 3a(hydrosilated) heated to 400° C. The absorptions at 2132 and 1890 cm$^{-1}$ in the FT-IR spectrum can be attributed to ene-yne (Helveger et al., *J. Polym. Sci. Part B. Polym. Phys.* 1989, 27, 1853) and butatriene (West et al., *J. Organomet. Chem.* 1970, 23, 53) functionalities, respectively, that are produced upon thermal polymerization of the diacetylene units of 3a(hydrosilated) to varying degrees of repeat units. From the area under the exotherms at 110° C. in the DSC thermograms of both 3a(hydrosilated) and 3b(hydrosilated), approximately one-third of the diacetylene units are believed to be participating in such a long-range order polymerization, suggesting that approximately one-third of the 3a or 3b linkers stay bound at only one of its termini to the clusters of 1. This explains the observed unreacted Si—H and vinyl absorptions of 1 and 3a or 3b, respectively, in the FT-IR spectrum of 3a(hydrosilated) and 3b(hydrosilated).

Example 7

Rheological Measurements of 3a(Hydrosilated), 3b(Hydrosilated), 3a(Polymerized) and 3b(polymerized)

Figure 13:
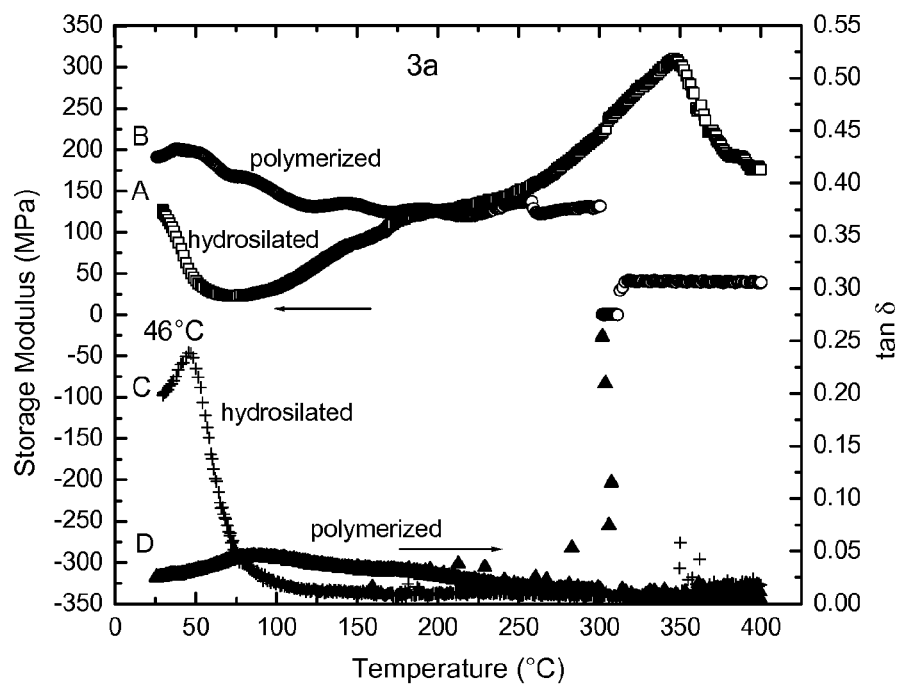
FIG. 13 shows the storage (G') and loss tangent (tan δ) of the various dendritic networks of this study. (top) 3a(hydrosilated) and 3a(polymerized). (bottom) 3b(hydrosilated) and 3b(polymerized). Plots A & B: G'. Plots C & D: tan δ.
Figure 13:
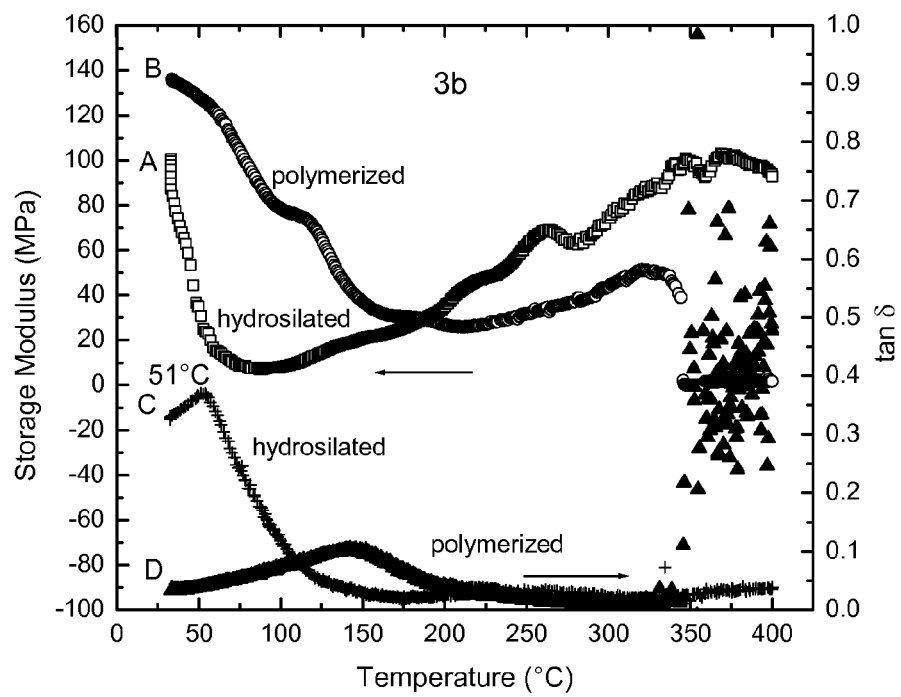

Rheological measurements were performed on rectangular solid samples formed from 3a(hydrosilated) and 3b(hydrosilated) networks, and their thermally polymerized versions, 3a(polymerized) and 3b(polymerized), to determine more accurately the $T_g$ of the networks and to measure their mechanical stiffness (modulus) (FIG. 13). The storage modulus (G') of the "as prepared" 3a(hydrosilated) (~130 MPa) was determined to be higher than that of a similar sample of 3b(hydrosilated) (~100 MPa). The $T_g$, taken as the maximum in tan δ, was observed to be lower for 3a(hydrosilated) (46° C.) relative to 3b(hydrosilated) (51° C.). In addition, a slightly broader tan δ peak for 3b(hydrosilated) suggested a broader range of relaxation times during the glassy to rubbery transition than in 3a(hydrosilated). During the thermal scan of 3a(hydrosilated) from 25 to 400° C., a steady increase in the storage modulus was observed after its $T_g$, starting from and corresponding to its first exotherm at ~115° C. in its DSC. During the progression of the run, a further dramatic increase in G' from 200 MPa to 325 MPa was observed from 300 to 330° C., enveloping the region of the second major exotherm at 306° C. in its DSC. These two increases in G' correspond to the two distinct thermal polymerization events of diacetylenes in 3a(hydrosilated). The enhancements in the G' value was followed by an equally dramatic decrease in G' finally stabilizing at a value of ~190 MPa near 400° C. (Wegner, *Naturforsch,* 1969, 24B, 824; Baughman, *J. Appl. Phys.* 1972, 43, 4362). It is presumed that above 330° C., further polymerization probably reduced G' of 3a(hydrosilated) due to the formation of possible non-deformable domains in the network. To verify this, a sample of 3a(hydrosilated) was initially thermally treated to 400° C. in $N_2$ to produce 3a(polymerized) and subsequently its G' was evaluated. The G' value at ambient temperature was found to be equal to ~190 MPa as obtained for 3a(hydrosilated) at 400° C. during its rheological run. The thermal treatment of 3b(hydrosilated) to 400° C. in $N_2$ for 2 h, on the other hand, was found to produce an extensively brittle sample, which was found not usable for rheological evaluations, indicating that upon diacetylene polymerization an even greater degree of non-deformable domains were formed in such a sample than in 3a(polymerized). Hence, a sample of 3b(hydrosilated) was treated to 310° C. for 1 h to produce an intact sample of 3b(polymerized) and a rheological measurement was performed on this sample. As anticipated, the G' (~140 MPa) of this sample at ambient temperature was found to be higher than that of the ambient temperature G' (~100 MPa) of the "as prepared" 3b(hydrosilated).

Example 8

Synthesis of the Crosslinker 4a from 3a and 1,4-Bis(Dimethylsilyl)Benzene 1,4-Bis(dimethylsilyl)benzene (0.1 g, 0.514 mmol) and 3a (0.225 g, 1.028 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2072 $cm^{-1}$ and ν (—CH═CH$_2$): 1596 $cm^{-1}$. $^1$H NMR (in ppm): 7.67 ($C_6H_5$—), 6.22-5.86 (—CH═CH$_2$) and (0.473 (of 1,4-bis(dimethylsilyl)benzene), 1.84 (—Si—CH$_2$—CH$_2$—Si—, $sp^2$ C), 0.278 (of 3a)) (—CH$_3$). $^{13}$C NMR (in ppm): (138.76, 133.66) (—CH═CH—, phenyl) (136.26, 134.92) (—CH═CH$_2$, alkene) ($sp^2$ C), (89.98, 85.04) (—C≡C—C≡C—) (sp C), 1.52 (—Si—CH$_2$—CH$_2$—Si—, $sp^2$ C), and (−1.02, −3.12) (–CH$_3$) ($sp^a$ C).

Example 9

Formation of the Inorganic-Organic Hybrid Hydrosilated Dendritic Network 4a(Hydrosilated) from Reaction of 1 and the Crosslinker 4a Octasilane-POSS 1 (0.50 g, 0.49 mmol) and 4a (1.24 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 125° C. and 320° C.

Example 10

Thermal Polymerization of Diacetylene Linkers in 4a(Hydrosilated) to Form 4a(Polymerized)

A sample of a clear film of 4a(hydrosilated) was treated in argon in a tube furnace at 250° C. for 30 min and at 400° C. for 2 h. The film was subsequently cooled to room temperature. The color of the film had changed to dark red ("red form") due to irreversible thermal polymerization. Glass transition temperatures ($T_g$) (from −60° C. to 400° C.@10° C./min) of the film: 18.52° C., 49.24° C.; No exotherms were observed as all diacetylene units had crosslinked on thermal polymerization.

Example 11

Synthesis of the Crosslinker 4b from 3b and 1,4-Bis(Dimethylsilyl)Benzene 1,4-Bis(dimethylsilyl)benzene (0.1 g, 0.514 mmol) and 3b (0.480 g, 1.028 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2072 $cm^{-1}$ and ν (—CH═CH$_2$): 1596 $cm^{-1}$. $^1$H NMR (in ppm): 7.68-7.38 ($C_6H_5$—) (of 3b)), 7.72 ($C_6H_5$—) (of 1,4-bis(dimethylsilyl)benzene), 6.58-6.05 (—CH═CH$_2$) 1.92 (—Si—CH$_2$—CH$_2$—Si—, $sp^2$ C), and (0.473) (—CH$_3$). $^{13}$C NMR (in ppm): (138.23, 135.82, 130.58, 128.25) ($C_6H_5$— of 3b) ($sp^2$ C) (138.82, 133.74) (—CH═CH—, phenyl of 1,4-bis(dimethylsilyl)benzene) (136.26, 134.92) (—CH═CH$_2$, alkene) ($sp^2$ C), (89.98, 85.04) (—C≡C—C≡C—) (sp C), 1.62 (—Si—CH$_2$—CH$_2$—Si—, $sp^2$ C), and (−3.12) (—CH$_3$) ($sp^a$ C). DSC analysis (from RT to 400° C. at 10° C./min) in $N_2$ of 4b: Melting endotherm at 105° C. and exotherm at 315° C.

Example 12

Formation of the Inorganic-Organic Hybrid Hydrosilated Dendritic Network 4b(Hydrosilated) from Reaction of 1 and the Crosslinker 4b Octasilane-POSS 1 (0.50 g, 0.49 mmol) and 4b (2.22 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 122° C. and 328° C.

Example 13

Thermal Polymerization of Diacetylene Linkers in 4b(Hydrosilated) to Form 4b(Polymerized)

A sample of a clear film of 4b(hydrosilated) was treated in argon in a tube furnace at 250° C. for 30 min and at 400° C. for 2 h. The film was subsequently cooled to room temperature.

Example 14

Synthesis of the Crosslinker 5a from 3a and 1,1,3,3,5,5,7,7-Octamethyltetrasiloxane 1,1,3,3,5,5,7,7-Octamethyltetrasiloxane (0.1 g, 0.354 mmol) and 3a (0.155 g, 0.708 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2068 cm$^{-1}$ and ν (—CH=CH$_2$): 1594 cm$^{-1}$.

Example 15

Formation of the Inorganic-Organic Hybrid Hydrosilated Dendritic Network 5a(Hydrosilated) from Reaction of 1 and the Crosslinker 5a Octasilane-POSS 1 (0.50 g, 0.49 mmol) and 5a (1.232 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 130° C. and 325° C.

Example 16

Thermal Polymerization of Diacetylene Linkers in 5a(Hydrosilated) to Form 5a(Polymerized)

A sample of a clear film of 5a(hydrosilated) was treated in argon in a tube furnace at 250° C. for 30 min and at 400° C. for 2 h. The film was subsequently cooled to room temperature. The color of the film had changed to dark red ("red form") due to irreversible thermal polymerization. Glass transition temperatures ($T_g$) (from −60° C. to 400° C.@10° C./min) of the film: −16.23° C., 47.86° C.; No exotherms were observed as all diacetylene units had crosslinked on thermal polymerization.

Example 17

Synthesis of the Crosslinker 5b from 3b and 1,1,3,3,5,5,7,7-octamethyltetrasiloxane 1,1,3,3,5,5,7,7-Octamethyltetrasiloxane (0.1 g, 0.354 mmol) and 3b (0.330 g, 0.708 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2072 cm$^{-1}$ and ν(—CH=CH$_2$): 1596 cm$^{-1}$. DSC analysis (from RT to 400° C. at 10° C./min) in N$_2$ of 5b: Melting endotherm at 101° C. and exotherm at 307° C.

Example 18

Formation of the Inorganic-Organic Hybrid Hydrosilated Dendritic Network 5b(Hydrosilated) from Reaction of 1 and the Crosslinker 5b Octasilane-POSS 1 (0.50 g, 0.49 mmol) and 5b (2.19 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 128° C. and 328° C.

Example 19

Thermal Polymerization of Diacetylene Linkers in 5b(Hydrosilated) to Form 5b(Polymerized)

A sample of a clear film of 5b(hydrosilated) was treated in argon in a tube furnace at 250° C. for 30 min and at 400° C. for 2 h. The film was subsequently cooled to room temperature. The color of the film had changed to dark red ("red form") due to irreversible thermal polymerization. Glass transition temperatures ($T_g$) (from −60° C. to 400° C.@10° C./min) of the film: 19.47° C., 52.04° C.; No exotherms were observed as all diacetylene units had crosslinked on thermal polymerization.

Example 20

Synthesis of the Crosslinker 6a from 3a and bis[(p-dimethylsilyl)phenyl]ether

Bis[(p-dimethylsilyl)phenyl]ether (0.1 g, 0.349 mmol) and 3a (0.152 g, 0.698 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2072 cm$^{-1}$ and ν (—CH=CH$_2$): 1596 cm$^{-1}$.

Example 21

Formation of the Inorganic-Organic Hybrid Hydrosilated Dendritic Network 6a(Hydrosilated) from Reaction of 1 and 6a Octasilane-POSS 1 (0.50 g, 0.49 mmol) and 6a (1.393 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 122° C. and 318° C.

Example 22

Thermal Polymerization of Diacetylene Linkers in 6a(Hydrosilated) to Form 6a(Polymerized)

A sample of a clear film of 6a(hydrosilated) was treated in argon in a tube furnace at 250° C. for 30 min and at 400° C. for 2 h. The film was subsequently cooled to room temperature.

The color of the film had changed to dark red ("red form") due to irreversible thermal polymerization. Glass transition temperatures ($T_g$) (from −60° C. to 400° C.@10° C./min) of the film: 20.26° C., 54.63° C.; No exotherms were observed as all diacetylene units had crosslinked on thermal polymerization.

Example 23

Synthesis of the Crosslinker 6b from 3b and bis[(p-dimethylsilyl)phenyl]ether

Bis[(p-dimethylsilyl)phenyl]ether (0.1 g, 0.349 mmol) and 3b (0.326 g, 0.698 mmol) were mixed in 2 mL of hexane in a vial and 90 μL (9.90 μmol of Pt) of the Karstedt catalyst solution was added and the mixture was mixed vigorously for 2 min using a mechanical stirrer to obtain a viscous product. FT-IR: ν (—C≡C—C≡C—): 2072 cm$^{-1}$ and ν (—CH═CH$_2$): 1596 cm$^{-1}$. DSC analysis (from RT to 400° C. at 10° C./min) in N$_2$ of 6b: Melting endotherm at 101° C. and exotherm at 307° C.

Example 24

Formation of the Inorganic-Organic Hybrid Hydrosilated Dendritic Network 6b(Hydrosilated) from Reaction of 1 and 6b Octasilane-POSS 1 (0.50 g, 0.49 mmol) and 6b (2.363 g, 1.97 mmol) were mixed with 2.5 mL of toluene to yield a clear solution. To this solution, 90 μL (9.90 μmol of Pt) of the Karstedt catalyst solution was added and the mixture was mixed vigorously for 5 min using a mechanical stirrer. The mixture was transferred into a Teflon mold and was heated on a hot plate at 80° C. for 1 h to facilitate the formation of a clear and transparent film. DSC thermogram of the product from 25° C. to 400° C.: Exotherms at 120° C. and 316° C.

Example 25

Thermal Polymerization of Diacetylene Linkers in 6b(Hydrosilated) to Form 6b(Polymerized)

A sample of a clear film of 6b(hydrosilated) was treated in argon in a tube furnace at 250° C. for 30 min and at 400° C. for 2 h. The film was subsequently cooled to room temperature. The color of the film had changed to dark red ("red form") due to irreversible thermal polymerization. Glass transition temperatures ($T_g$) (from −60° C. to 400° C.@10° C./min) of the film: 20.87° C., 55.24° C.; No exotherms were observed as all diacetylene units had crosslinked on thermal polymerization.

Example 26

Synthesis of the Acetylene Analogs, 7a and 7b, of 3a and 3b

Anhydrous THF (50 mL) and n-BuLi (46.7 mL, 2.5 M, 116.75 mmol) were transferred to a sealed 50-mL Kjeldahl reaction flask containing a magnetic stir bar. The reactions flask had been evacuated under vacuum and back-filled with argon prior to the additions. The flask was then immersed in a dry ice/2-propanol bath. While stirring, trichloroethylene (3.5 mL, 38.9 mmol) was added dropwise over 20 min, forming a pale yellow solution. The dry ice/2-propanol bath was removed and the reaction mixture was warmed to room temperature with stirring over 2 h. The mixture was then cooled further in a dry ice/2-propanol bath and vinyldimethylchlorosilane (10.8 mL, 77.8 mmol) or vinyldiphenylchlorosilane (17.6 mL, 77.8 mmol) was added drop wise to initiate the formation of 7a or 7b, respectively. The reaction mixture was further warmed to room temperature with stirring over 2 h and the contents were then poured into a saturated NH$_4$Cl solution (150 mL, aqueous) at 0° C. The reaction flask was then rinsed with Et$_2$O into the NH$_4$Cl quench solution. The resulting two-phase mixture was transferred to a 500-mL separatory funnel and washed with a saturated NH$_4$Cl (aq) solution until the pH was neutral and then two times with distilled H$_2$O. The organic phase was poured into an Erlenmeyer flask and dried over anhydrous Na$_2$SO$_4$ and activated carbon. The dried solution was filtered through celite into a round-bottomed flask, concentrated by rotary evaporation, and then exposed to reduced pressure at room temperature for 5 h to yield 7a or 7b, respectively. (Ijadi-Maghsoodi et al., *J. Polym. Sci.: Part A: Polym. Chem.* 1990, 28, 955-965)

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A crosslinked polymer made by:
   a hydrosilation reaction of a polyhedral oligomeric silsesquioxane having pendant siloxane groups with an acetylene- and silicon-containing compound having at least two vinyl or ethynyl groups to form a polymer;
      wherein the hydrosilation reaction occurs between the pendant siloxane groups and the vinyl or ethynyl groups; followed by
   crosslinking the acetylene groups in the polymer.

2. The crosslinked polymer of claim 1, wherein the polyhedral oligomeric silsesquioxane is $((SiH(CH_3)_2O)SiO_{1.5})_8$.

3. The crosslinked polymer of claim 1, wherein the acetylene-containing compound is

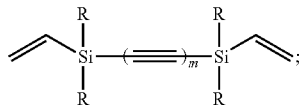

wherein m is 1 or 2; and
wherein each R is methyl or phenyl.

4. The crosslinked polymer of claim 1, wherein the acetylene-containing compound includes one or more compounds having the formula:

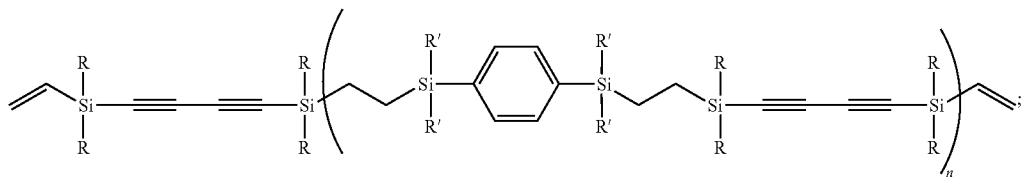

wherein n is a positive integer;
wherein each R is methyl or phenyl; and
wherein each R' is methyl, alkyl, or aryl.

5. The crosslinked polymer of claim 1, wherein the acetylene-containing compound includes one or more compounds having the formula:

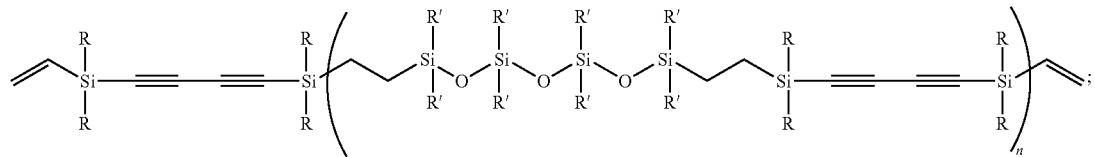

wherein n is a positive integer;
wherein each R is methyl or phenyl; and
wherein each R' is methyl, alkyl, or aryl.

6. The crosslinked polymer of claim 1, wherein the acetylene-containing compound includes one or more compounds having the formula:

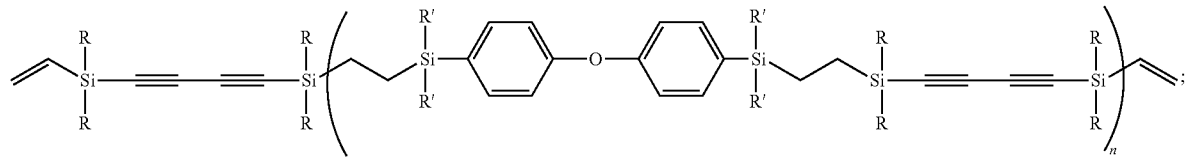

wherein n is a positive integer;
wherein each R is methyl or phenyl; and
wherein each R' is methyl, alkyl, or aryl.

* * * * *